(12) United States Patent
Mototsune et al.

(10) Patent No.: US 9,394,982 B2
(45) Date of Patent: Jul. 19, 2016

(54) LOCK-UP DEVICE FOR TORQUE CONVERTER

(71) Applicant: EXEDY Corporation, Neyagawa-shi, Osaka (JP)

(72) Inventors: Ken Mototsune, Neyagawa (JP); Naoki Tomiyama, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/766,297

(22) PCT Filed: Mar. 18, 2014

(86) PCT No.: PCT/JP2014/057269
§ 371 (c)(1),
(2) Date: Aug. 6, 2015

(87) PCT Pub. No.: WO2014/167955
PCT Pub. Date: Oct. 16, 2014

(65) Prior Publication Data
US 2016/0017972 A1    Jan. 21, 2016

(30) Foreign Application Priority Data
Apr. 9, 2013    (JP) .................................. 2013-080957

(51) Int. Cl.
*F16H 45/02*    (2006.01)

(52) U.S. Cl.
CPC ........ *F16H 45/02* (2013.01); *F16H 2045/0205* (2013.01); *F16H 2045/0226* (2013.01); *F16H 2045/0294* (2013.01)

(58) Field of Classification Search
CPC ............ F16H 45/02; F16H 2045/0221; F16H 2045/0226; F16H 2045/0294
See application file for complete search history.

(56) References Cited

U.S. PATENT DOCUMENTS

| | | | | |
|---|---|---|---|---|
| 4,693,348 A | * | 9/1987 | Tsukamoto | ....... F16F 15/12366 192/213.1 |
| 4,987,980 A | * | 1/1991 | Fujimoto | .......... F16F 15/12346 192/213.1 |
| 2007/0051577 A1 | * | 3/2007 | Avins | ................ F16F 15/12366 192/3.29 |
| 2009/0183962 A1 | | 7/2009 | Nakamura | |
| 2011/0011691 A1 | * | 1/2011 | Tomiyama | .............. F16H 45/02 192/3.29 |

FOREIGN PATENT DOCUMENTS

| | | |
|---|---|---|
| JP | 2008-138797 A | 6/2008 |
| JP | 2009-156270 A | 7/2009 |
| JP | 2009-168226 A | 7/2009 |
| JP | 2011-179515 A | 9/2011 |
| JP | 2011-252584 A | 12/2011 |
| JP | 2012-219999 A | 11/2012 |

* cited by examiner

*Primary Examiner* — Huan Le
(74) *Attorney, Agent, or Firm* — Global IP Counselors, LLP

(57) ABSTRACT

A lock-up device having multistage torsional characteristics includes a retaining plate, a driven plate, a plurality of pairs of outer peripheral side torsion springs configured to elastically couple the both plates, a support plate and a plurality of inner peripheral side torsion springs. The support plate is rotatable relative to the retaining plate and the driven plate, and causes the outer peripheral side coil springs in each pair to act in a series-like manner. Each inner peripheral side torsion spring has a length shorter than that of each outer peripheral side torsion spring. Additionally, the support plate is configured to be restricted from rotating relative to the driven plate when stopper parts of the support plate contact intermediate stopper parts of the driven plate.

6 Claims, 8 Drawing Sheets

LOCK-UP DEVICE FOR TORQUE CONVERTER

CROSS-REFERENCE TO RELATED APPLICATIONS

This application is a U.S. National stage application of International Application No. PCT/JP2014/057269, filed Mar. 18, 2014, which claims priority to Japanese Patent Application No. 2013-080957, filed in Japan on Apr. 9, 2013, the entire contents of which are hereby incorporated by reference.

BACKGROUND

1. Field of Invention

The present invention relates to a lock-up device, particularly to a lock-up device for a torque converter for transmitting a torque and absorbing and attenuating a torsional vibration.

2. Background Information

Torque converters are often equipped with a lock-up device for directly transmitting a torque from a front cover to a turbine. The lock-up device includes a piston capable of being frictionally coupled to the front cover, a retaining plate fixed to the piston, a plurality of pairs of torsion springs supported by the retaining plate, and a driven plate configured to be elastically coupled to the piston through the plural torsion springs in a rotational direction. The driven plate is fixed to the turbine (e.g., Japan Laid-open Patent Application Publication No. 2008-138797).

The piston is herein mounted between the front cover and the turbine, and the torque of the front cover is configured to be transmitted to the piston when an annular friction facing fixed to the outer peripheral part of the piston is pressed onto a friction surface of the front cover. The torque transmitted to the piston is transmitted to the turbine through the torsion springs and the driven plate. Then, variation in torque to be inputted from an engine is absorbed and attenuated by the plural torsion springs composing part of a damper mechanism.

On the other hand, a lock-up device equipped with a damper mechanism having multistage torsional characteristics has been also already provided for effectively absorbing and attenuating variation in torque (e.g., Japan Laid-open Patent Application Publication No. 2011-179515).

SUMMARY

Technical Problems

In the lock-up device described in Japan Laid-open Patent Application Publication No. 2011-179515, a first stage characteristic is set by causing each pair of torsion springs having different magnitudes of stiffness to act in a series-like manner by an intermediator. Additionally, afterwards, a second characteristic is configured to be set by compressing the low stiffness one of each pair of torsion springs such that the coiled parts thereof are closely contacted to each other, and thus, by actuating only the high stiffness one of each pair of torsion springs.

However, when the low stiffness torsion spring is compressed such that the coiled parts thereof are closely contacted to each other, stress acting on the torsion springs increases during actuation of the torsion springs and durability of the torsion springs degrades. Therefore, this hinders extension of device life.

It is an object of the present invention to particularly alleviate stress acting on low stiffness torsion springs and to extend device life.

Solution to Problems

A lock-up device for a torque converter according to an aspect of the present invention is a device for transmitting a torque and simultaneously absorbing and attenuating a torsional vibration, and includes an input rotary member, an output rotary member, a plurality of pairs of first coil springs, an intermediator and a plurality of second coil springs. The plurality of pairs of first coil springs are configured to elastically couple the input rotary member and the output rotary member in a rotational direction. The intermediator is rotatable relatively to the input rotary member and the output rotary member in a predetermined angular range, and is configured to cause the first coil springs in each pair to act in a series-like manner. The second coil springs are configured to elastically couple the input rotary member and the output rotary member in the rotational direction, and each has a length shorter than a length of each of the first coil springs. Furthermore, the intermediator is configured to be restricted from rotating relatively to either the input rotary member or the output rotary member when the intermediator is partially contacted to either the input rotary member or the output rotary member.

In the present lock-up device, the torque from the engine is transmitted from the input rotary member to the output rotary member. At this time, when a torsional vibration is produced, the torsional vibration is absorbed and attenuated by the actuation of the plurality of pairs of the first coil springs and the plurality of second coil springs.

In this case, firstly, when the first coil springs in each pair are started being compressed, the torsional vibration is absorbed and attenuated in accordance with the torsional stiffness of the first coil springs in each pair (a first stage torsional characteristic). Next, the intermediator is partially contacted to either the input rotary member or the output rotary member in the course of actuation of the first coil springs in each pair. Accordingly, while the function of the intermediator is disabled, the torsional vibration is absorbed and attenuated in accordance with the torsional stiffness of the first coil springs (a second stage torsional characteristic). Afterwards, the second coil springs are compressed, and thereby, the torsional vibration is absorbed and attenuated in accordance with the torsional stiffness of the second coil springs (a third stage torsional characteristic).

Multistage torsional characteristics can be herein set. Additionally, the intermediator is restricted from rotating relatively to either the input rotary member or the output rotary member while being partially contacted thereto. Thus, similarly to a well-known device, each first coil spring can be actuated in a range of the torsional characteristics that each first coil spring is not compressed with the coiled parts thereof being closely contacted to each other. Hence, stress acting on each first coil spring can be alleviated, and durability of each first coil spring can be enhanced.

The first coil springs in each pair are preferably composed of a low stiffness coil spring and a high stiffness coil spring that has a torsional stiffness higher than a torsional stiffness of the low stiffness coil spring. Furthermore, the intermediator is preferably restricted from rotating relatively to the input rotary member and the output rotary member before each of the low stiffness coil springs is compressed such that coiled parts thereof are closely contacted to each other.

Herein, each low stiffness coil spring is not compressed with the coiled parts thereof being closely contacted to each other. Hence, the first coil springs are enhanced in durability.

Each of the high stiffness coil springs is preferably configured to be actuated in a torsion angular range wider than an angle allowing the intermediator to rotate relatively to the input rotary member and the output rotary member.

The second coil springs are preferably configured to start being actuated after the high stiffness coil springs are actuated.

The second coil springs are preferably disposed on an inner peripheral side of the first coil springs. In the construction, the first coil springs and the second coil springs are disposed in different radial positions. Hence, this enhances flexibility in design.

The second coil springs are preferably configured to be restricted from being compressed when the input rotary member and the output rotary member are partially contacted to each other and are restricted from rotating relative to each other.

As described above, according to the present invention, in the lock-up device for a torque converter, stress acting on the low stiffness torsion springs can be especially alleviated, and device life can be extended.

DESCRIPTION OF EXEMPLARY EMBODIMENTS

Figure 1:
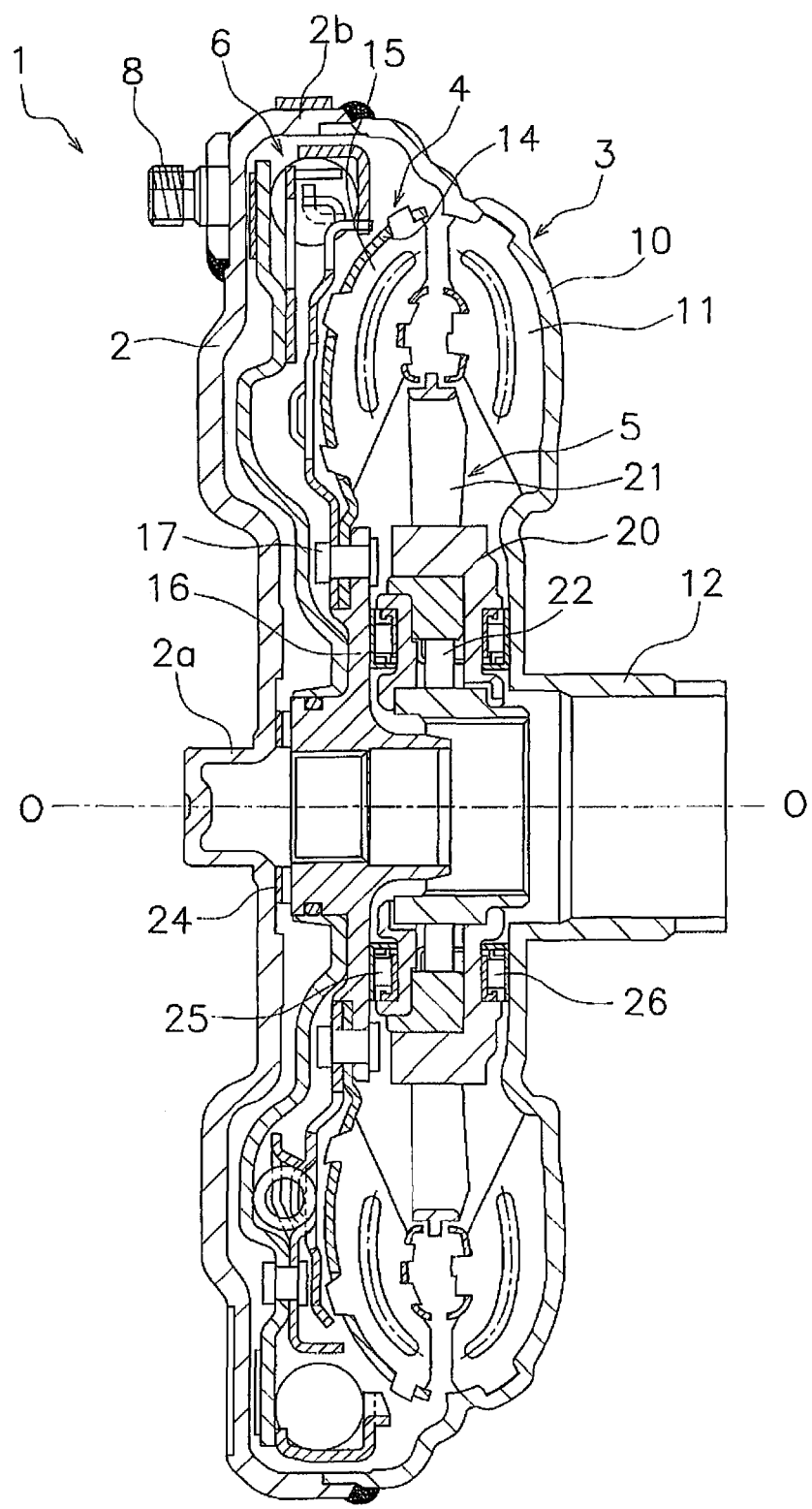
FIG. 1 is a cross-sectional view of a torque converter equipped with a lock-up device according to an exemplary embodiment of the present invention.

FIG. 1 is a partial cross-sectional view of a torque converter 1 employing a lock-up device as an exemplary embodiment of the present invention. In FIG. 1, an engine (not shown in the drawing) is disposed on the left side, whereas a transmission (not shown in the drawing) is disposed on the right side. Line O-O depicted in FIG. 1 is a rotational axis of the torque converter and the lock-up device.

Entire Construction of Torque Converter

The torque converter 1 is a device that is coupled to an engine-side member by a flexible plate (not shown in the drawing) and is configured to transmit a torque from a crankshaft of the engine to an input shaft of the transmission. The torque converter 1 is composed of a front cover 2, an impeller 3, a turbine 4, a stator 5 and a lock-up device 6.

The front cover 2 is a plate-shaped member, has a center boss 2a mounted to the inner peripheral end thereof, and has an outer peripheral side tubular part 2b formed as the outer peripheral part thereof to extend axially toward the transmission. The center boss 2a is a cylindrical member axially extending and is inserted into a center hole of the crankshaft. A plurality of bolts 8 are fixed to the outer peripheral part of the front cover 2 and are circumferentially aligned at equal intervals. The outer peripheral part of the flexible plate is fixed to the front cover 2 by nuts to be screwed onto the bolts 8.

The impeller 3 is mainly composed of an impeller shell 10, a plurality of impeller blades 11 fixed to the inside of the impeller shell 10, and an impeller hub 12 fixed to the inner peripheral part of the impeller shell 10. The outer peripheral edge of the impeller shell 10 is welded to the tip end of the outer peripheral side tubular part 2b of the front cover 2.

The turbine 4 is disposed axially in opposition to the impeller 3. The turbine 4 is mainly composed of a turbine shell 14, a plurality of turbine blades 15 fixed to the impeller-side surface of the turbine shell 14, and a turbine hub 16 fixed to the inner peripheral edge of the turbine shell 14. The turbine shell 14 and the turbine hub 16 are fixed by a plurality of rivets 17. Additionally, a spline is formed on the inner peripheral surface of the turbine hub 16 to be engaged with the input shaft of the transmission.

The stator 5 is a mechanism for regulating the flow of operating oil returning from the turbine 4 to the impeller 3, and is disposed between the inner peripheral part of the impeller 3 and that of the turbine 4. The stator 5 is mainly composed of an annular stator shell 20 and a plurality of stator blades 21 mounted to the outer peripheral surface of the stator shell 20. The stator shell 20 is supported by a tubular stationary shaft (not shown in the drawing) through a one-way clutch 22. The stationary shaft extends between the outer peripheral surface of the input shaft of the transmission and the inner peripheral surface of the impeller hub 12.

A thrust washer 24 is disposed axially between the inner peripheral part of the front cover 2 and the turbine hub 16. Additionally, a thrust bearing 25 is disposed between the turbine hub 16 and the inner peripheral part of the stator 5, whereas a thrust bearing 26 is disposed axially between the stator 5 and the impeller 3.

Lock-Up Device 6

Figure 2:
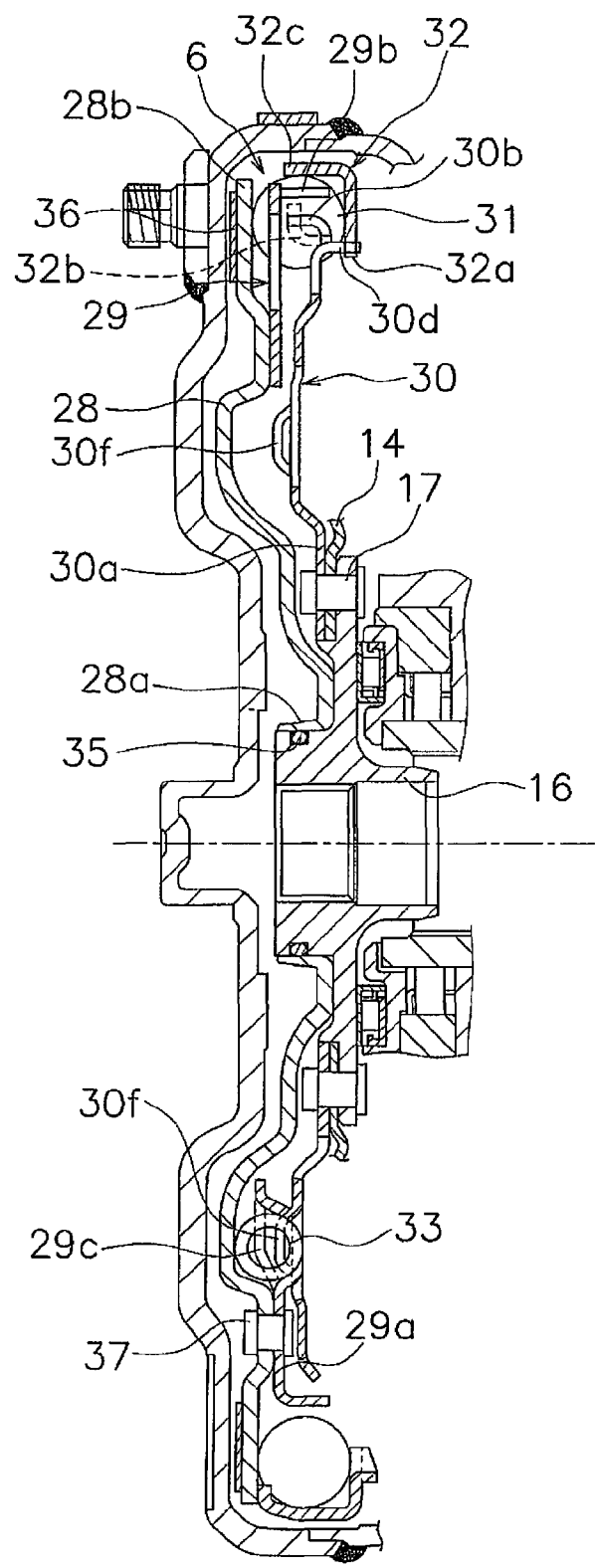
FIG. 2 is a cross-sectional view showing the lock-up device extracted from FIG. 1.
Figure 3:
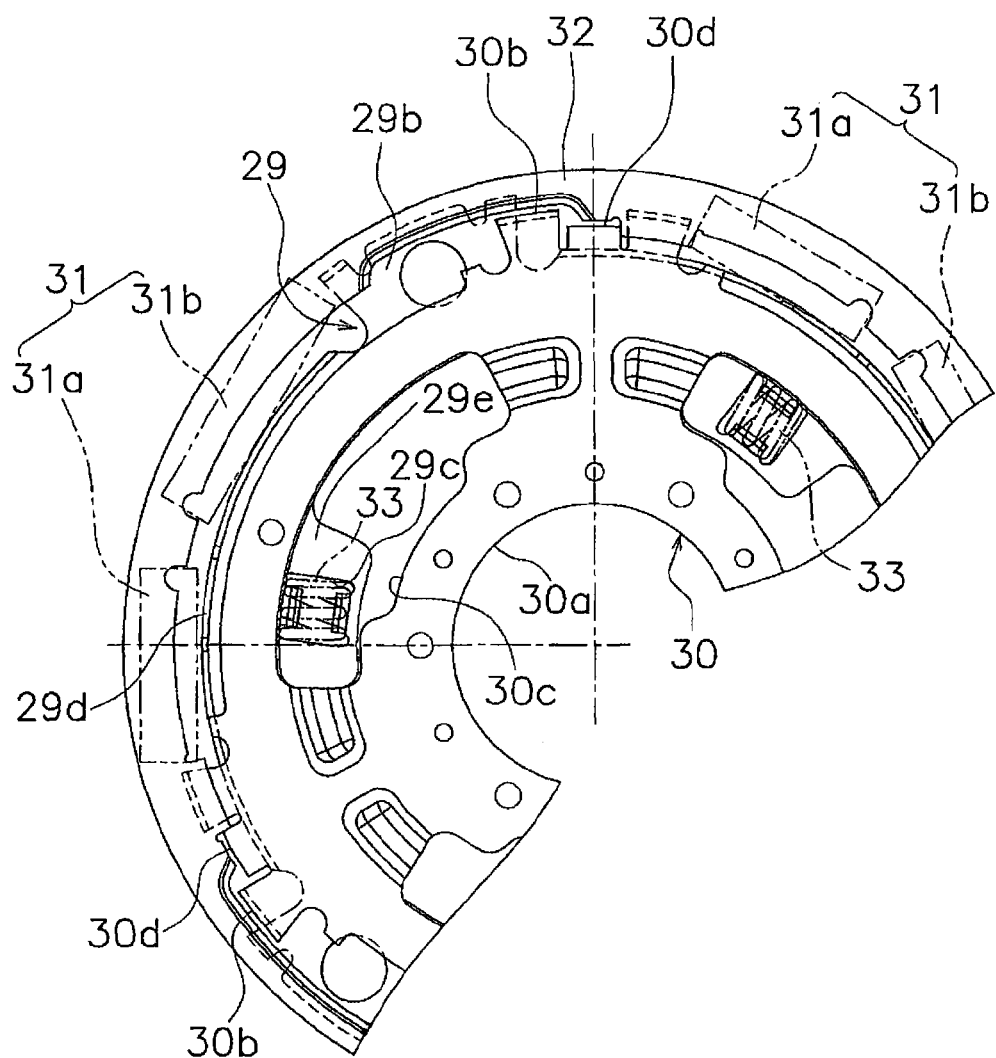
FIG. 3 is a partial front view of the lock-up device.

The lock-up device 6 is a mechanism disposed between the front cover 2 and the turbine 4 to mechanically couple both elements. As shown in FIGS. 2 and 3, the lock-up device 6 includes a piston 28 composing a part of a clutch portion, a retaining plate 29 (an input rotary member), a driven plate 30 (an output rotary member), a plurality of outer peripheral side torsion springs 31 (first coil springs), a support plate (an intermediator) 32, and a plurality of inner peripheral side torsion springs 33 (second coil springs). It should be noted that FIG. 2 is a diagram showing the lock-up device 6 extracted from FIG. 1, whereas FIG. 3 is a front view of the lock-up device 6. FIG. 3 shows a condition that the lock-up device 6 is rotated by a predetermined angle (an angle corresponding to a bent point P1 in FIG. 7 to be described) without illustrating some constituent members.

Piston 28

The piston 28 is a member for performing clutch engagement/disengagement, and is a disc-shaped member in which a center hole is bored. The piston 28 has an inner peripheral side tubular part 28a that is formed on the inner peripheral edge thereof to extend axially toward the engine. The inner peripheral side tubular part 28a is supported by the engine-side outer peripheral surface of the turbine hub 16 to be movable in the rotational direction and the axial direction. It should be noted that an annular seal member 35 is mounted to the engine-side outer peripheral surface of the turbine hub 16 to contact the inner peripheral surface of the inner peripheral side tubular part 28a.

The piston 28 has a friction coupling part 28b formed on the outer peripheral part thereof. The friction coupling part 28b is an annular part having a predetermined length in the radial direction, and has an annular friction facing 36 bonded to the front cover 2-side surface thereof. Thus, the piston 28 and the flat friction surface of the front cover 2 compose the clutch portion of the lock-up device 6.

Retaining Plate 29 and Inner Peripheral Side Torsion Springs 33

Figure 4:
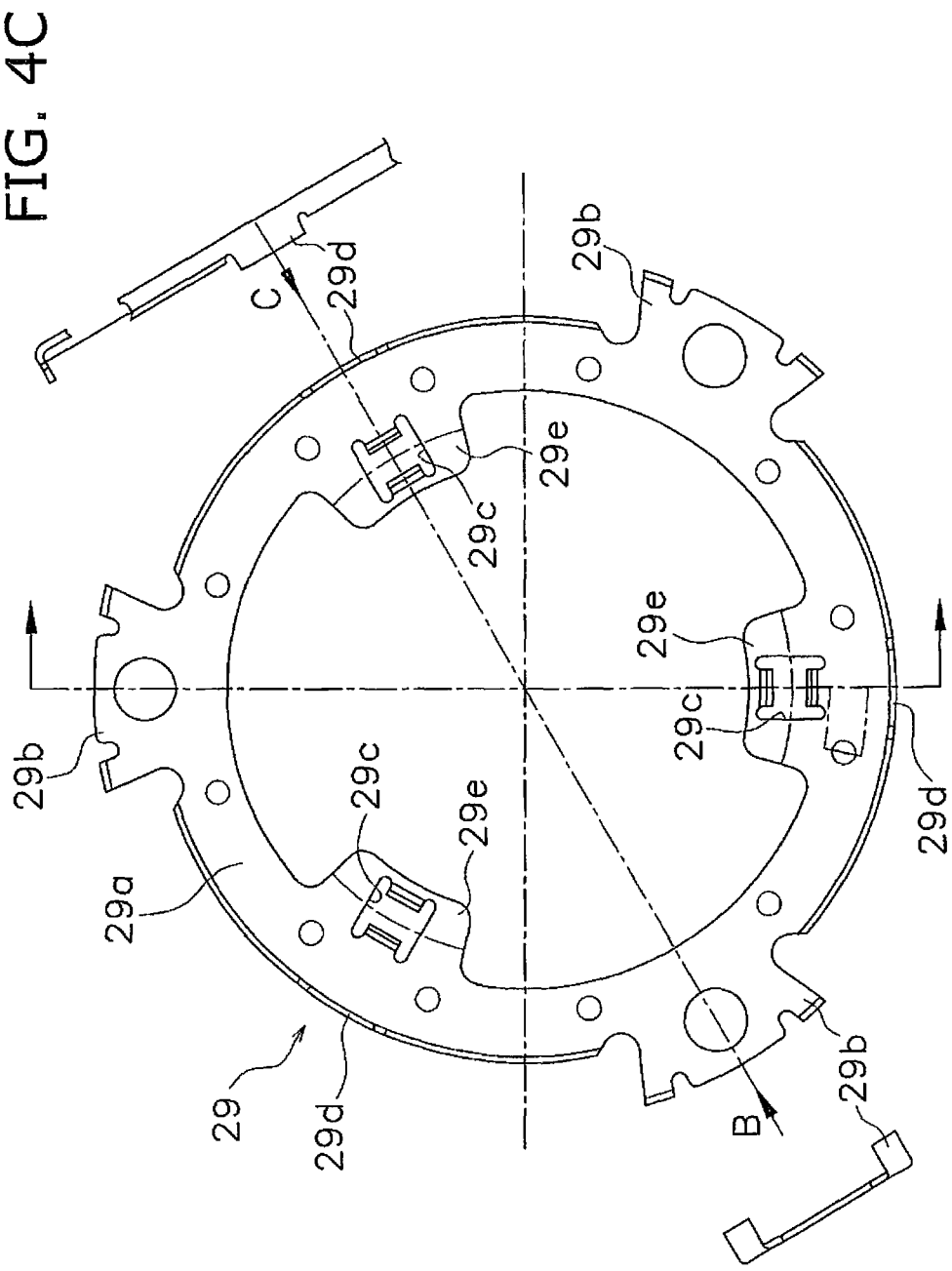
FIGS. 4A-4C are front views of a retaining plate.

The retaining plate 29 has an annular shape and is disposed on the turbine 4 side of the outer peripheral part of the piston 28. As shown in FIGS. 4A-4C, the retaining plate 29 has a fixation part 29a, a plurality of engaging parts 29b, a plurality of spring accommodation parts 29c and a plurality of stopper parts 29d. FIG. 4A is a front view, FIG. 4B is a view seen from a direction of arrow B, and FIG. 4C is a view seen from a direction of arrow C.

As shown in FIG. 2, the fixation part 29a is fixed to the piston 28 by rivets 37, and is contacted to a lateral surface of the piston 28.

The engaging parts 29b extend from the fixation part 29a to the outer peripheral side, and are circumferentially aligned at equal angular intervals. As shown in FIG. 4B, the outer peripheral end of each engaging part 29b is bent partially (at the both circumferential ends thereof) toward the turbine. Additionally, the both circumferential end surfaces of each engaging part 29b are contactable to the circumferential end surfaces of the outer peripheral side torsion springs 31.

The spring accommodation parts 29c are respectively formed in a plurality of extending parts 29e that extend from the fixation part 29a to the inner peripheral side. The extending parts 29e are circumferentially aligned at equal angular intervals such that each is disposed circumferentially between two engaging parts 29b. Each spring accommodation part 29c is an opening formed by partially cutting and raising each extending part 29e toward the turbine. Each inner peripheral side torsion spring 33 is accommodated in each spring accommodation part 29c.

As shown in FIG. 4C, the stopper parts 29d are formed by partially bending the outer peripheral end of the retaining plate 29 toward the turbine to be located in the same circumferential positions as the spring accommodation parts 29c.

Driven Plate 30

Figure 5:
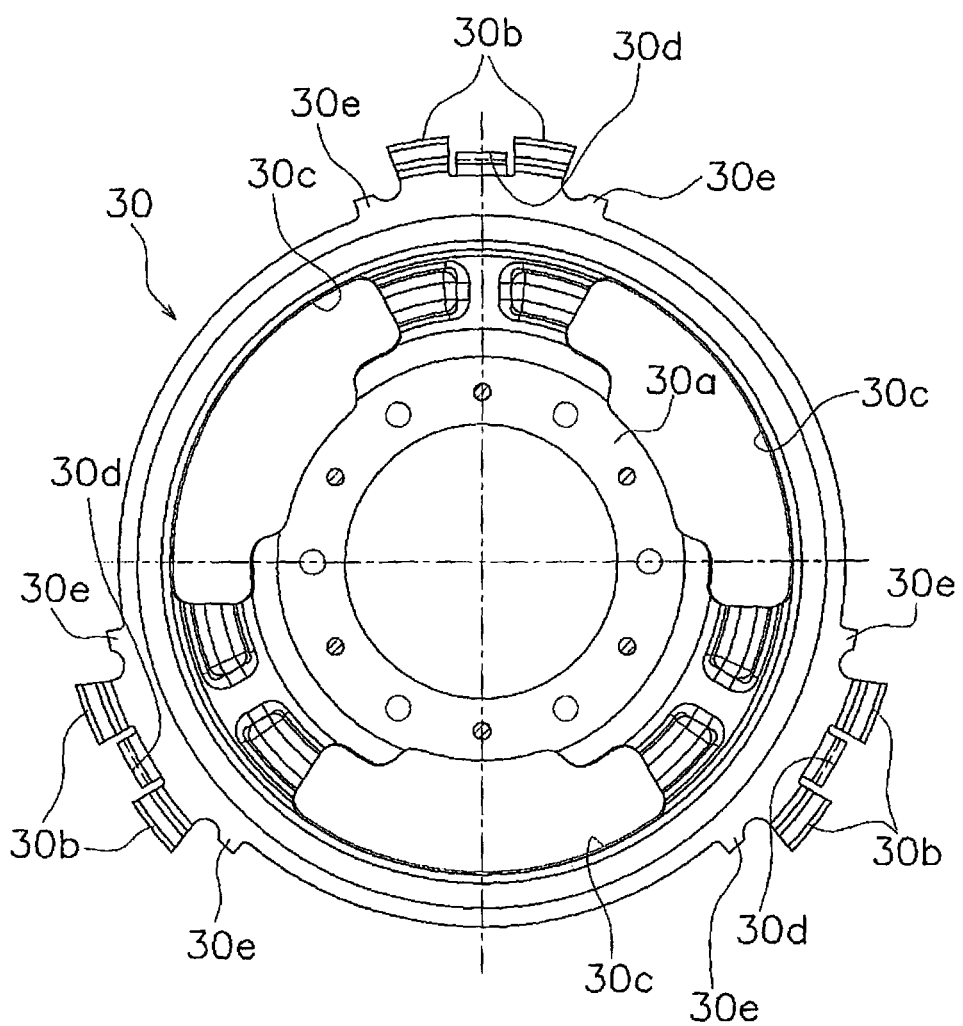
FIG. 5 is a front view of a driven plate.

FIG. 5 is a front view of the driven plate 30. The driven plate 30 has an annular and roughly disc-plate shape, and is disposed on the turbine side of the retaining plate 29. The driven plate 30 has an annular fixation part 30a formed as the inner peripheral part thereof, a plurality of engaging parts 30b formed on the outer peripheral part thereof, a plurality of spring actuation parts 30c formed on the outer peripheral side of the fixation part 30a, a plurality of intermediate stopper parts 30d and final stopper parts 30e.

As shown in FIG. 2, the fixation part 30a is fixed together with the turbine shell 14 to the turbine hub 16 by the rivets 17. The plural engaging parts 30b are formed on the outermost peripheral side, and pairs of two engaging parts 30b are circumferentially disposed at equal angular intervals. Each engaging part 30b has a shape bent toward the front cover 2.

The spring actuation parts 30c are a plurality of circular-arc shaped openings extending in the circumferential direction. The spring actuation parts 30c are formed in circumferential regions in which the engaging parts 30b are not formed. Each spring accommodation part 29c of the retaining plate 29 and each inner peripheral side torsion spring 33 can be partially accommodated in each spring actuation part 30c. Additionally, protruding parts 30f (see FIG. 2) are formed on the both circumferential ends of each spring actuation part 30c to protrude toward the front cover 2. The protruding parts 30f are contactable to the circumferential end surfaces of the inner peripheral side torsion springs 33.

Each intermediate stopper part 30d is formed circumferentially between each pair of the engaging parts 30b, and has a shape bent toward the turbine 4. Additionally, each pair of the final stopper parts 30e is formed to interpose therebetween each pair of the engaging parts 30b and protrudes to the outer peripheral side.

Support Plate 32 and Outer Peripheral Side Torsion Springs 31

Figure 6:
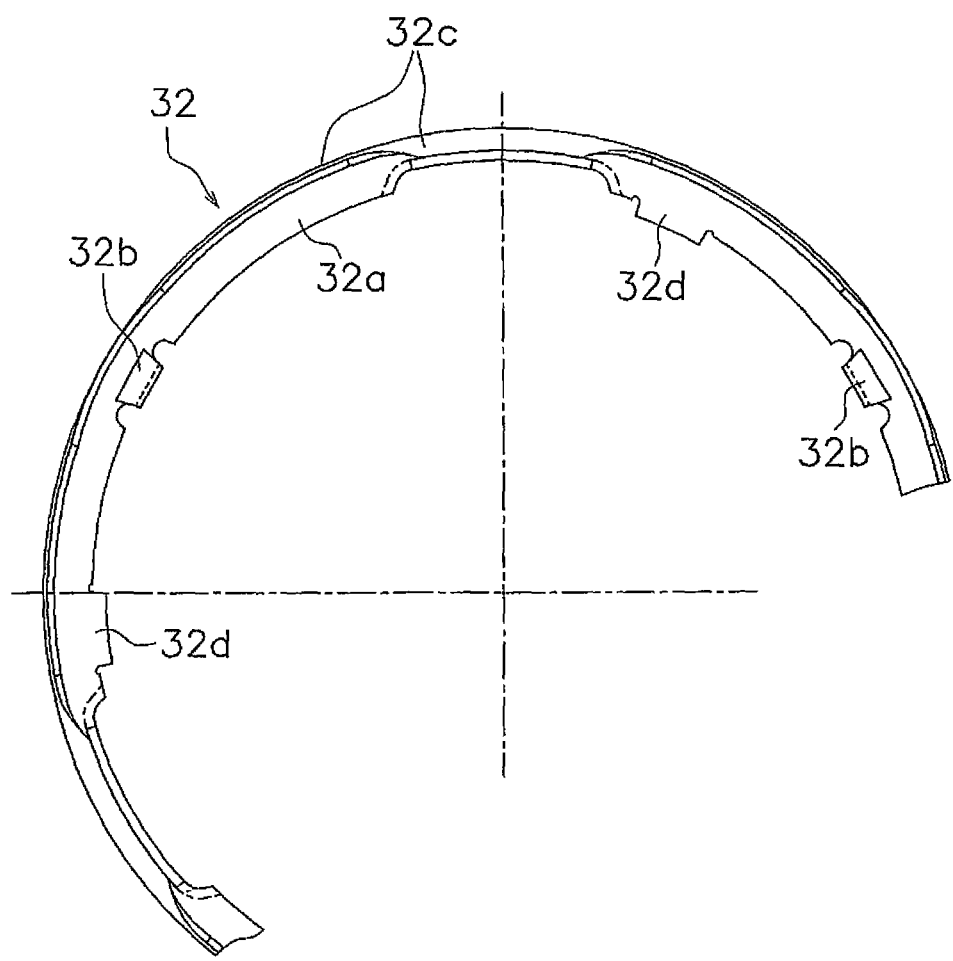
FIG. 6 is a partial front view of a support plate.

FIG. 6 is a partial front view of the support plate 32. The support plate 32 has an annular shape, and has a disc part 32a, a plurality of engaging parts 32b, an outer peripheral support part 32c and a plurality of stopper parts 32d. The support plate 32 is disposed to be rotatable relative to the retaining plate 29 and the driven plate 30 in a predetermined angular range.

The disc part 32a is disposed on the turbine 4 side of the outer peripheral side torsion springs 31, and restricts axial movement of the outer peripheral side torsion springs 31 together with the piston 28. The plural engaging parts 32b extend from the disc part 32a to the inner peripheral side, then extend toward the front cover 2, and are bent at the tip ends thereof to the outer peripheral side. Each pair of the outer peripheral side torsion springs 31 is disposed to interpose therebetween each engaging part 32b. The outer peripheral support part 32c is formed to extend from the outer peripheral part of the disc part 32a toward the front cover 2, and restricts radial movement of the outer peripheral side torsion springs 31. Each stopper part 32d is formed by extending the inner peripheral part of the disc part 32a to the further inner peripheral side, and is disposed away from each engaging part 32b at a predetermined angular interval in one direction.

In the present example, three pairs of the outer peripheral side torsion springs 31 are provided. As shown in FIG. 3, each pair of the outer peripheral side torsion springs 31 is composed of a low stiffness spring 31a and a high stiffness spring 31b having higher stiffness than the low stiffness spring 31a. Additionally, as described above, the opposed end surfaces of the low stiffness spring 31a and the high stiffness spring 31b are contacted to each engaging part 32b, and thus, the both springs 31a and 31b act in a series-like manner. It should be noted that the both springs 31a and 31b respectively have a longer free length than peripheral torsion spring 33.

Action

In a range of low engine rotational speed, the piston 28 is moved toward the turbine 4 by difference in hydraulic pressure between the front cover 2 side and the turbine 4 side of the piston 28. Thus, the friction facing 36 separates away from the front cover 2, and a lock-up state is released.

When the engine rotational speed increases, contrarily to the above, the piston 28 is moved toward the front cover 2, and thus, the friction facing 36 is pressed onto the friction surface of the front cover 2. As a result, the torque of the front cover 2 is transmitted from the piston 28 to the driven plate 30 through the retaining plate 29 and the outer peripheral side and inner peripheral side torsion springs 31 and 33. Furthermore, the torque is transmitted to the turbine 4 from the driven plate 30.

In the aforementioned lock-up state, a torsional vibration is absorbed and attenuated by the outer peripheral side and inner peripheral side torsion springs 31 and 33. This will be hereinafter explained.

Figure 7:
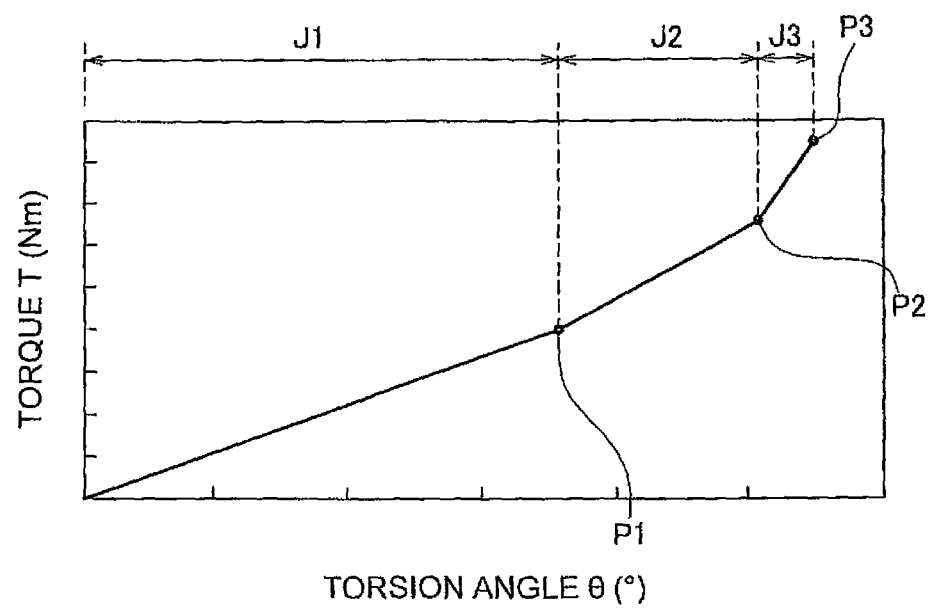
FIG. 7 is a diagram showing torsional characteristics of the lock-up device.
Figure 8A:
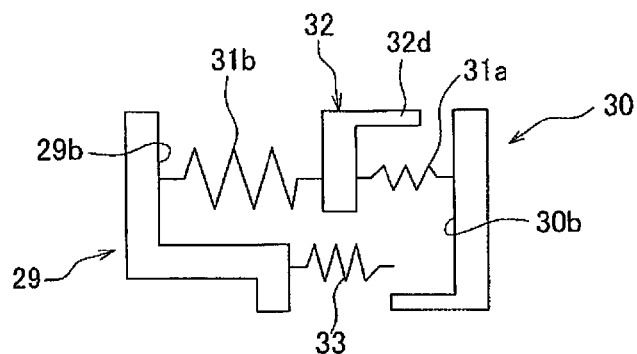
FIGS. 8A-8D include model diagrams in activation of torsion springs of the lock-up device.
Figure 8B:
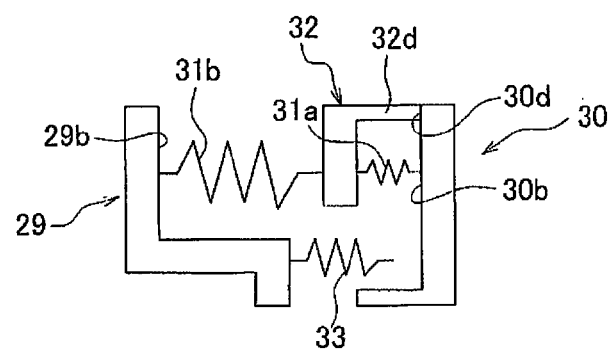
Figure 8C:
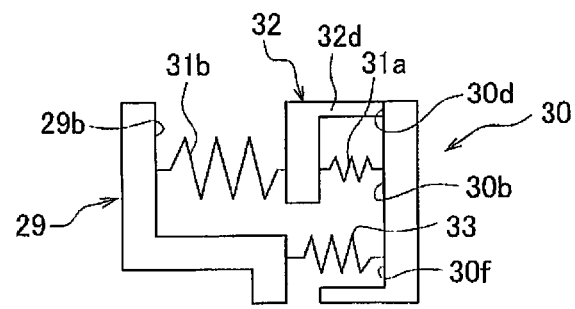
Figure 8D:
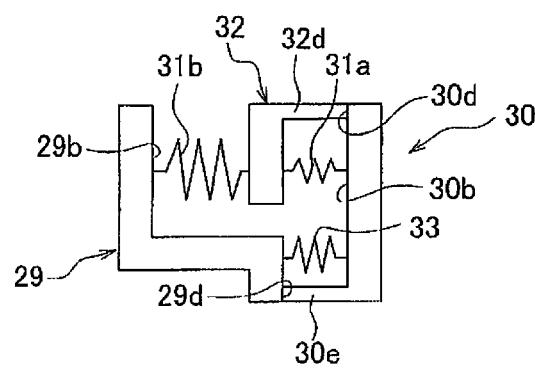

FIG. 7 is a diagram showing torsional characteristics to be obtained in actuation of the respective torsion springs 31 and 33. On the other hand, FIG. 8 includes model diagrams in actuation of the respective torsion springs 31 and 33 in the respective stages of the torsional characteristics.

When a torsional vibration is inputted from the front cover 2 and then the retaining plate 29 and the driven plate 30 are rotated relatively to each other, firstly, the outer peripheral side torsion springs 31 are circumferentially compressed between the retaining plate 29 and the driven plate 30. In the condition (a range indicated by J1 in FIG. 6 and a condition shown in FIG. 8A), only each low stiffness spring 31a is compressed. It should be noted that depending on the stiffness settings of each low stiffness spring 31a and each high stiffness spring 31b, each high stiffness spring 31b could start being compressed in the range J1.

Specifically, the low stiffness and high stiffness springs 31a and 31b are rotation-directionally compressed between the relevant engaging part 29b of the retaining plate 29 and the relevant engaging part 30b of the driven plate 30. At this time, the support plate 32 is rotated together with the both springs 31a and 31b, and is rotated relatively to the retaining plate 29 and the driven plate 30.

When a torsion angle θ then increases, before each low stiffness spring 31a is compressed such that the coiled parts thereof are closely contacted to each other, each stopper part 32d of the support plate 32 is contacted to each intermediate stopper part 30d of the driven plate 30, and the support plate 32 and the driven plate 30 are prevented from being rotated relatively to each other. This condition corresponds to a first bent point P1 in FIG. 7. On the other hand, FIG. 3 shows this condition and corresponds to FIG. 8B.

When the torsion angle θ further increases from the first bent point P1, only each high stiffness spring 31b is compressed because the support plate 32 and the driven plate 30 are prevented from being rotated relatively to each other. This condition is a range indicated by J2 in FIG. 7. This corresponds to a condition transitioning from FIG. 8B to FIG. 8C.

When the torsion angle θ further increases, each inner peripheral side torsion spring 33 accommodated in each spring accommodation part 29c of the retaining plate 29 is contacted to the protruding part 30f on one end surface of each opening (each spring actuation part 30c) of the driven plate 30 (this condition corresponds to a second bent point P2 in FIG. 6 and FIG. 8C), and starts being compressed at this point of time.

At and after the bent point P2, each high stiffness spring 31b and each inner peripheral side torsion spring 33 are compressed. This condition is a range indicated by J3 in FIG. 6 and corresponds to FIG. 8D. Then, each stopper part 29d of the retaining plate 29 is finally contacted to the relevant final stopper part 30e of the driven plate 30, and the retaining plate 29 and the driven plate 30 are prevented from being rotated relatively to each other (P3 in FIG. 6).

Features

In the present exemplary embodiment as described above, before each low stiffness spring 31a is compressed such that the coiled parts thereof are closely contacted to each other, each stopper part 32d of the support plate 32 is contacted to each intermediate stopper part 30d of the driven plate 30. Thus, multi-stage torsional characteristics can be realized without causing each low stiffness spring 31a to be compressed such that the coiled parts thereof are closely contacted to each other. Consequently, stress acting on each low stiffness spring 31a can be alleviated, and durability of each low stiffness spring 31a can be enhanced.

Other Exemplary Embodiments

In the present exemplary embodiment, each stopper part 32d of the support plate 32 is configured to be contacted to each intermediate stopper part 30d of the driven plate 30 to prevent each low stiffness spring 31a from being compressed such that the coiled parts thereof are closely contacted to each other. However, a part of the support plate 32 may be configured to be contacted to a part of the retaining plate.

The configuration for causing the support plate to be contacted to the driven plate is not limited to that in the present exemplary embodiment, and can be realized in a variety of ways.

In the present exemplary embodiment, the inner peripheral side torsion springs are disposed on the inner peripheral side of the outer peripheral side torsion springs. However, the positional arrangement of the torsion springs is not limited to the above. For example, first coil springs and the second coil springs may be disposed in the same radial position.

According to the lock-up device for a torque converter of the present invention, stress acting on a torsion spring having lower stiffness is particularly alleviated, and device life can be extended.

The invention claimed is:

1. A lock-up device for a torque converter for transmitting a torque and simultaneously absorbing and attenuating a torsional vibration, comprising:
   an input rotary member;
   an output rotary member;
   a plurality of pairs of first coil springs configured to elastically couple the input rotary member and the output rotary member in a rotational direction;
   an intermediator rotatable relative to the input rotary member and the output rotary member and configured to cause the first coil springs in each pair to act in series; and
   a plurality of second coil springs, each of the second coil springs having a length shorter than a length of each of the first coil springs and being configured to elastically couple the input rotary member and the output rotary member in the rotational direction,
   the intermediator being configured to be restricted from rotating relative to either the input rotary member or the output rotary member when the intermediator is partially contacted to either the input rotary member or the output rotary member.

2. The lock-up device for the torque converter recited in claim 1, wherein
   the plurality of pairs of first coil springs in each pair are composed of a low stiffness coil spring and a high stiffness coil spring, the high stiffness coil spring having a torsional stiffness higher than a torsional stiffness of the low stiffness coil spring, and
   the intermediator is restricted from rotating relative to the input rotary member and the output rotary member before each of the low stiffness coil springs is compressed such that coiled parts thereof are closely contacted to each other.

3. The lock-up device for the torque converter recited in claim 2, wherein
   each of the high stiffness coil springs is configured to be actuated in a torsion angular range larger than an angular range in which the intermediator rotates relative to the input rotary member and the output rotary member.

4. The lock-up device for the torque converter recited in claim 3, wherein
   the plurality of second coil springs are configured to start being actuated after the high stiffness coil springs are actuated.

5. The lock-up device for the torque converter recited in claim 4, wherein
   the plurality of second coil springs are configured to be restricted from being compressed when the input rotary member and the output rotary member are partially contacted to each other and are restricted from rotating relative to each other.

6. The lock-up device for the torque converter recited in claim 1, wherein the plurality of second coil springs are disposed on an inner peripheral side of the plurality of pairs of first coil springs.

* * * * *